1,891,348

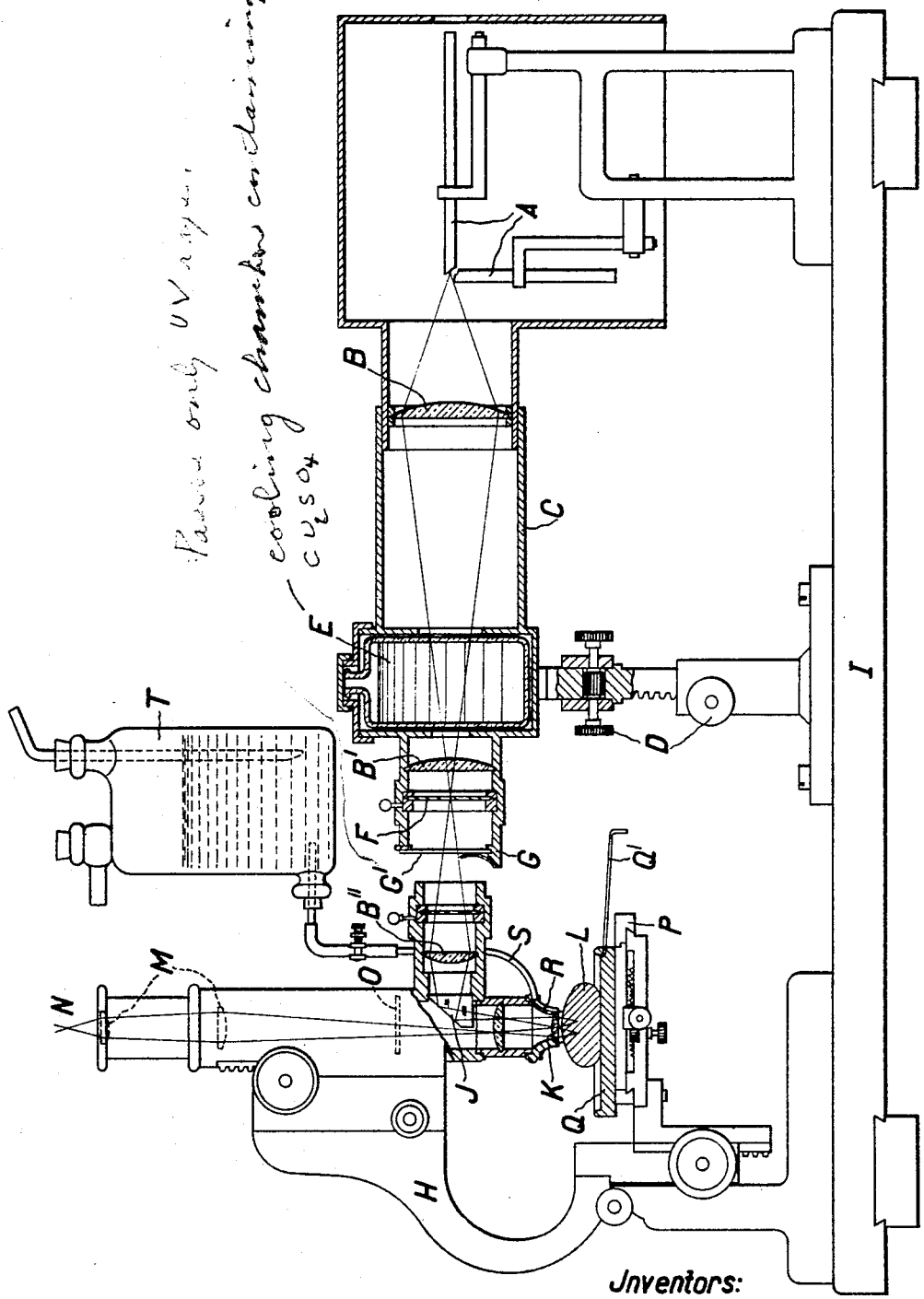
Dec. 20, 1932. P. ELLINGER ET AL 1,891,348
METHOD AND DEVICE FOR MICROSCOPICALLY VIEWING LIVING OBJECTS
Filed Oct. 23, 1930
Inventors:
Philipp Ellinger
August Hirt Patented Dec. 20, 1932

UNITED STATES PATENT OFFICE

PHILIPP ELLINGER AND AUGUST HIRT, OF HEIDELBERG, GERMANY, ASSIGNORS TO THE FIRM CARL ZEISS, OF JENA, GERMANY

METHOD AND DEVICE FOR MICROSCOPICALLY VIEWING LIVING OBJECTS

Application filed October 23, 1930, Serial No. 490,800, and in Germany October 29, 1929.

An application has been filed in Germany October 29, 1929.

Usual histological technics allow microscopic examination of original bodies only in sections. This proceeding is disadvantageous in so far as it affords the microscopist only a momentary image and even this in a form which, owing to the alteration caused by the necessary killing of the object and the preparation method, does not permit to arrive at exact conclusions. Functional studies are possible only with living textures. Hitherto such examination could be effected in a simple manner only in case of the rare transparent organs as, for instance, the web of a frog, which were viewed in transmitted light through an ordinary microscope. To examine organs of greater thickness was possible in incident light only. This kind of examination is connected with great methodical deficiencies. To the microscopist's eye is presented only the most superficial layers of the organ and a finer differentiation even of these parts is rather difficult. Experiments which were made with a view to improve the possibility of differentiation by inserting reflectors into the textures did to a certain extent make the possibility of differentiation a better one but, on the other hand, this proceeding considerably influenced the organic functions, and thus eventual ameliorations in the visibility of the structures were completely neutralized by the injuries done to the organ.

Surprisingly good results were arrived at by a new method of fluorescence microscopy which permits to examine in function human organs as well as the organs of animals and plants. The fundamental idea of the present invention was to place the source of light necessary for microscopic examination into the object itself. This is achieved by injecting fluorescent substances into the hypodermic cellular tissue of, e. g., the animal to be examined. These substances are received by the blood and deposited in any organs. The fluorescent substances to be injected for the said purpose conveniently have such a chemical character that, like for instance the fluorescein, they combine only with the basic or, like the trypaflavin i. e. a substance of the chemical composition

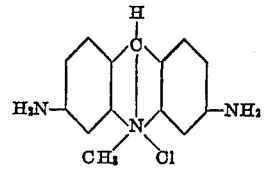

only with the acidic components of the cells and thus permit of differentiating the cell structure. In order not to impair the organic functions these substances must be poison-free. When using visible light for inciting fluorescence, the examination is disturbed by the disadvantage that part of the transmitted light falling on the object is directed from this object to the eye diffusely or reflectedly and consequently outshines the image of the object, thus rendering the examination nearly impossible. This drawback is avoided by using invisible ultraviolet light for the incitation of fluorescence and by stopping down eventual reflected parts of this light by means of a filter which, while passing the incited fluorescence light nearly unimpededly absorbs the shortwaved inciting rays.

If a dry system were used, the organ under examination would be made to desiccate and its desiccating surface would render a radiation impossible. It is therefore advisable to continuously spray with a physiological nutritious solution, e. g. Ringer solution, the surface as well as the objective, which otherwise would become dimmed. For this reason dry systems are conveniently not used and also in case of slight magnifications immersion systems are applied which continuously supply the liquid to the front lens. One can use for instance a liquid tank with controllable discharge, and the mount of the objective may have a groove to which the rinsing liquid is supplied by a tube. In this case the objectives must be adapted to suit the immersion liquid. The object stage is conveniently provided with a draining device and made displaceable in three directions perpendicular to each other so as to allow of easily moving the object to the objective.

The accompanying drawing shows an example of the invention in a longitudinal view, partly in section.

A is an arc lamp serving as light source the light of which passes through the collecting lenses B, B', and B''. The lenses B and B' are provided in a light protection device C in which are also disposed a cooling chamber containing sulphate of copper, E, and an iris diaphragm F. At one end of the light protection device is a filter support G. By means of two rack-and-pinion devices D which are perpendicular to each other the light protection device can be adjusted vertically and horizontally. The filter support G holds a filter G' which passes only ultraviolet light. The light protection device is fixed to a base plate I which also supports the microscope stand H. A totally reflecting prism J throws the light through the microscope objective K into the object L where it incites the fluorescence light. The image produced of the rays of the fluorescence light by the objective K is made visible to the observer's eye N or directed into a recording device (a photographic camera or a light-electric cell) by the ocular M. Between the objective K and the ocular M is disposed a filter O which absorbs all ultraviolet light but, on the other hand, passes visible light unobstructedly. The stage P is displaceable in three directions perpendicular to each other and supports a plate Q having a bent rim and a discharge pipe Q'. The immersion liquid is stored in a tank T and led to the objective by means of a tube S. A groove R at the objective mount conveys the immersion liquid to the front lens. The discharge of the liquid from the tank can be controlled and the rate of discharge observed.

We claim:

1. A method of presenting microscopic views of living objects in function, consisting in applying a light source adapted to emit rays of short-wave length, injecting into the object substances adapted to emit fluorescence light, directing the said rays to the object, and then receiving the fluorescence rays by means of a microscope.

2. A method of presenting microscopic views of living objects in function, consisting in applying a light source adapted to emit rays of short-wave length, injecting into the object substances adapted to emit fluorescence light, directing the said rays to the object, and then receiving by means of a microscope the fluorescence rays emanating from the object in the direction opposite to that of the rays inciting the fluorescence light.

3. A method of presenting microscopic views of living objects in function, consisting in applying a light source adapted to emit rays of short-wave length, injecting into the object substances adapted to coact with the constituents of the object and to emit fluorescence light, directing the said rays to the object and then receiving the fluorescence rays by means of a microscope.

4. In a method according to claim 3, fluorescein being injected into the object.

5. In a method according to claim 3, trypaflavin being injected into the object.

6. A method of presenting microscopic views of living objects in function, consisting in applying a light source adapted to emit rays of short wave-length, injecting into the object substances adapted to emit fluorescence light, directing the said rays to the object, rinsing the object with a liquid, and then receiving the fluorescence rays by means of a microscope.

7. In a method according to claim 6, the object being rinsed with a physiological nutritious solution.

8. In a method according to claim 6, the object being rinsed with Ringer solution.

9. In a method according to claim 1, the microscope comprising a microscope objective, and the object and the microscope objective being rinsed with a physiological nutritious solution.

10. A device for presenting microscopic views of living objects in function, comprising a light source adapted to emit rays of short wave-length, optical means interposed between the light source and the object and adapted to direct these rays to the object, a microscope adapted to form an image of the fluorescence rays emanating from the object, and means for rinsing the object with a liquid.

11. A device for presenting microscopic views of living objects in function comprising an arc lamp, optical means interposed between the light source and the object and adapted to direct these rays to the object, a microscope adapted to form an image of the fluorescence rays emanating from the object, and means for rinsing the object with a liquid.

12. A device for presenting microscopic views of living objects in function, comprising a light source adapted to emit rays of short wave-length, optical means interposed between the light source and the object and adapted to direct these rays to the object, a microscope disposed in such a manner as to receive the fluorescence rays emanating from the object in the direction opposite to the rays inciting the fluorescence light, the microscope being adapted to form an image of the fluorescence rays emanating from the object, and means for rinsing the object with a liquid.

13. A device for presenting microscopic views of living objects in function, comprising a light source adapted to emit ultraviolet rays, optical means interposed between the light source and the object and adapted to direct these rays to the object, a microscope adapted to form an image of the fluorescence rays emanating from the object, and means for rinsing the object with a liquid.

14. A device for presenting microscopic views of living objects in function, comprising a light source adapted to emit rays of short wave-length, optical means interposed between the light source and the object and adapted to direct these rays to the object, a miscroscope adapted to form an image of the fluorescence rays emanating from the object, a microscope objective forming part of the microscope, and means for rinsing the object and the microscope objective with a liquid.

15. A device for presenting microscopic views of living objects in function, comprising a light source adapted to emit rays of short wave-length, optical means interposed between the light source and the object and adapted to direct these rays to the object, a microscope adapted to form an image of the fluorescence rays emanating from the object, a microscope objective forming part of the microscope, a groove applied in the mount of the microscope objective, a liquid tank disposed above the microscope, and a pipe connecting the said tank and the said groove.

16. A device for presenting microscopic views of living objects in function, comprising a light source adapted to emit rays of short wave-length, optical means interposed between the light source and the object and adapted to direct these rays to the object, a mircoscope adapted to form an image of the fluorescence rays emanating from the object, a stage attached to the microscope and adapted to receive the object, the said stage having a protruding rim and a discharge pipe, and means for rinsing the object with a liquid.

17. In a device according to claim 16, means for adjusting the stage relatively to the microscope in three directions perpendicular to each other.

18. A device for presenting microscopic views of living objects in function, comprising a light source adapted to emit rays of short wave-length, optical means interposed between the light source and the object and adapted to direct these rays to the object, a microscope adapted to form an image of the fluorescence rays emanating from the object, a microscope objective forming part of the microscope, this objective being composed of single lenses adapted to pass fluorescence rays, and means for rinsing the object and the microscope objective with a liquid.

19. A device for presenting microscopic views of living objects in function, comprising a light source adapted to emit rays of short wave-length, a microscope, a microscope objective forming part of the microscope, a reflector disposed above the microscope objective and being inclined to the axis of the objective, a system of collecting lenses interposed between the light source and the said reflector, and means for rinsing the object with a liquid.

20. A device for presenting microscopic views of living objects in function, comprising a light source adapted to emit ultraviolet rays, a microscope, a microscope objective forming part of the microscope, a reflector disposed above the microscope objective and being inclined to the axis of the objective, a system of collecting lenses interposed between the light source and the said reflector, a filter adapted to pass only ultraviolet rays, and an iris diaphragm, both being disposed in front of the said reflector, and means for rinsing the object with a liquid.

21. A device for presenting microscopic views of living objects in function, comprising a light source adapted to emit rays of short wave-length, a microscope, a microscope objective forming part of the microscope, a reflector disposed above the microscope objective and being inclined to the axis of the objective, a system of collecting lenses interposed between the light source and the said reflector, a microscope ocular forming part of the microscope, a filter adapted to absorb ultraviolet rays and being disposed in front of the microscope ocular, and means for rinsing the object with a liquid.

PHILIPP ELLINGER.
AUGUST HIRT.